United States Patent [19]
Wanie

[11] Patent Number: 5,586,955
[45] Date of Patent: Dec. 24, 1996

[54] NEUTRAL START MECHANISM FOR A HYDROSTATIC TRANSMISSION

[75] Inventor: Lee J. Wanie, Horicon, Wis.

[73] Assignee: Deere & Company, Moline, Ill.

[21] Appl. No.: 514,279

[22] Filed: Aug. 11, 1995

[51] Int. Cl.[6] ................................................ F16H 63/36
[52] U.S. Cl. .................................. 477/99; 74/474; 74/570
[58] Field of Search ........................... 477/99, 114, 165; 74/474, 477, 570, 571 R, 571 L, 571 M, 527, 48, 512

[56] References Cited

U.S. PATENT DOCUMENTS

| | | | |
|---|---|---|---|
| 3,613,817 | 10/1971 | Glass et al. | 180/6.48 |
| 3,858,675 | 1/1975 | Geis | 180/66 R |
| 4,279,179 | 7/1981 | Marto | 477/99 |
| 4,759,417 | 7/1988 | Wanie et al. | 180/6.34 |
| 4,883,137 | 11/1989 | Wanie et al. | 180/6.34 |

OTHER PUBLICATIONS

Brochure published by Gravely International, Inc., entitled "Gravely Promaster 400 Series", 6 pages (see particularly p. 3), dated Jul. 1992, published in the U.S.A.

Copies of six photographs showing the control mechanism found on vehicles sold by Gravely International, Inc., 2 pages containing copies of six photographs taken in 1990 by employee of Deere & Company.

Sketch drawn by employee of Deere & Company showing a schematic representation of the control mechanism found on the Gravely Promaster 400 Series vehicles, 1 page, sketched approximately 25 Apr. 1990.

*Primary Examiner*—Vinh T. Luong
*Assistant Examiner*—Sherry Lynn Estremsky

[57] ABSTRACT

A neutral start mechanism having first and second arm members coupled with an input control shaft of a hydrostatic transmission and which extend at angles to one another for being pulled back to a neutral position by a spring. First and second slots are formed in the second arm member for receiving first and second pin members which are positioned in the end portions of the slots when the linkage is in its neutral mode. First and second switches are positioned adjacent the end portions of the first and second slots for sensing the presence of the pin members within the end portions of the slots. The switches are coupled with the vehicle power source for preventing the power source from being started when the pins are not in the end portions of the slots and the linkage and transmission are not in a neutral, non-driving mode.

3 Claims, 2 Drawing Sheets

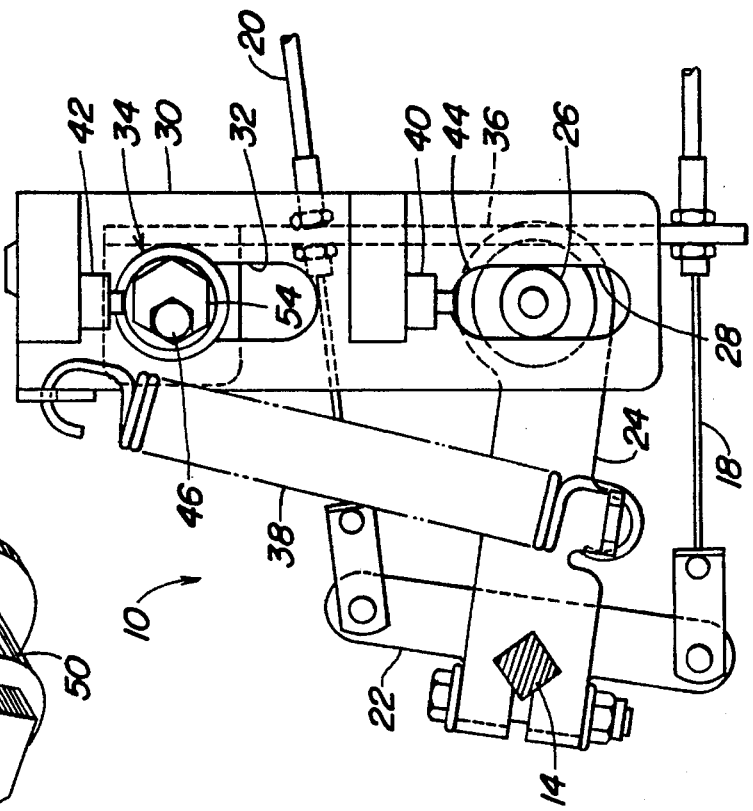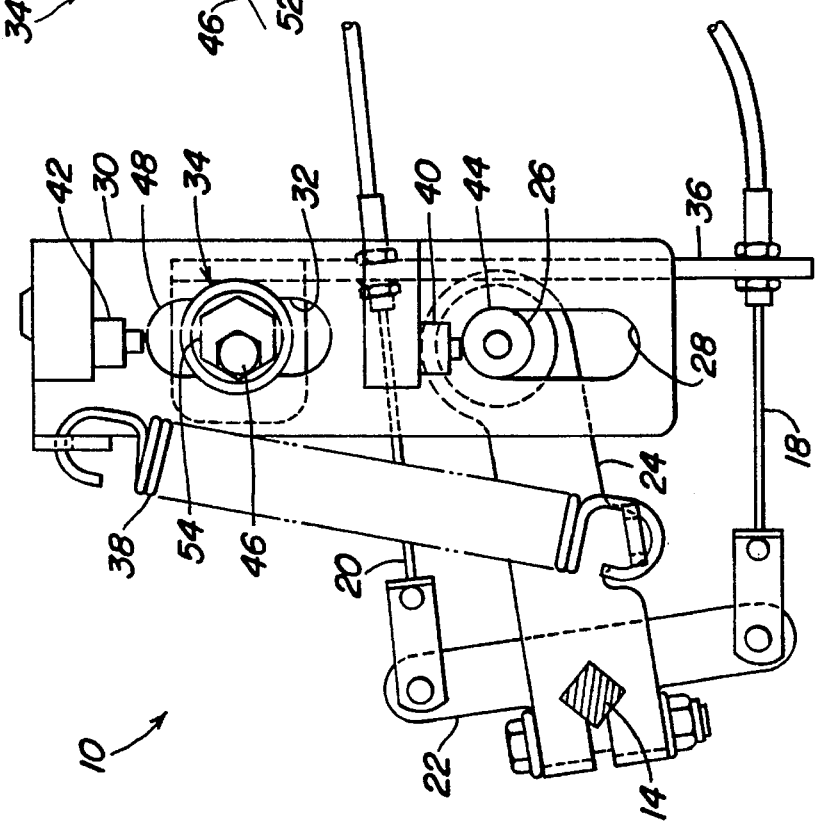

NEUTRAL START MECHANISM FOR A HYDROSTATIC TRANSMISSION

FIELD OF THE INVENTION

This device relates to neutral start mechanisms usable with hydrostatic transmissions.

BACKGROUND OF THE INVENTION

It is known to provide vehicles with hydrostatic transmissions having an input control shaft which is pivoted in a first direction to propel the vehicle forward, and which is pivoted in the other direction for driving the vehicle in the reverse direction. Vehicles with hydrostatic transmissions include a control mechanism or linkage structure operatively connected to the input control shaft for allowing an operator of the vehicle to control the operation of the transmission. These control linkages typically include a hand lever or foot pedals engagable by the operator during vehicle travel. These linkages typically include a neutral return feature which pivots the input control shaft back to its neutral position when the operator releases the hand lever or foot pedal. Many such neutral return linkages are relatively complex and include a relatively large number of parts. Some conventional neutral return linkages are adjustable for allowing the operator to adjust the linkage to return the hydrostatic transmission to a precise neutral mode such that the vehicle will not creep in the forward or reverse direction when the linkage is in its neutral mode. This adjustment feature tends to add complexity to the linkage and can add a high number of parts of the overall structure.

It is also known to provide a neutral start feature on vehicles having hydrostatic transmissions. Neutral start mechanisms are designed to prevent the vehicle power source or engine from being started while the transmission is in a driving, non-neutral mode, and thereby generally prevent the vehicle from lunging forward when started. Conventional neutral start mechanisms tend to add complexity to the overall linkage structure and contribute to a relatively high overall part count for the linkage structure.

Therefore it would be desirable to provide a control linkage mechanism for a hydrostatic transmission which returns the transmission to a neutral mode when the operator releases the control, which is simple in construction and operation, and has a relatively low part count. It would be desirable for such a mechanism to be adjustable for insuring that the hydrostatic transmission is returned to its precise neutral, non-driving mode by the linkage when the operator controls are disengaged. It would be desirable to provide such a mechanism with a neutral start feature which prevents the operator from starting the vehicle when the transmission is in any mode other than its neutral mode. It would be desirable for such a neutral start mechanism to be relatively simple in construction, having relatively few pads, and having a relatively low cost of manufacture and assembly.

SUMMARY OF THE INVENTION

The preferred embodiment of the present invention provides a hydrostatic transmission control linkage for a vehicle. The transmission includes an input control shaft pivotable for controlling the speed and direction of the vehicle. The linkage extends between the input control shaft and a pair of foot pedals engagable by the operator for driving the vehicle in either the forward or reverse directions. Tension cables extend between the pedals and a bracket mounted with the input control shaft. A first arm member is also rigidly mounted to the input control shaft, and includes a first pin member. The pin member is received within a first slot of a second arm member. The second arm member also includes a second slot within which is received a second pin member or eccentric mechanism mounted to the vehicle. A tension spring extends between the first and second arm members and acts to return the arm members to their respective positions corresponding with the neutral mode of the hydrostatic transmission when the foot pedals are disengaged.

During forward travel the forward pedal is depressed, which pulls the first cable and pivots the bracket, input control shaft and first arm member in the counterclockwise direction. The first pin member presses against the end portion of the first slot, which forces the second arm member to shift upwardly with respect to the second pin member. The spring becomes stretched such that when the operator removes his foot from the forward pedal the spring will bias the first and second arm members back to their original, neutral positions.

During reverse vehicle travel the reverse pedal is depressed which pulls the second cable and pivots the bracket, input control shaft and first arm member in the clockwise direction. The first pin member shifts downwardly within the first slot, and the abutment of the second pin member against the end portion of the second slot prevents the second arm member from also shifting downwardly. As the first arm member shifts downwardly with respect to the second arm member the spring will stretch and become tensioned. Therefore, when the operator disengages the pedal the spring will urge or bias the first arm member back up to its position corresponding with the neutral mode of the hydrostatic transmission.

First and second button-type switches are mounted to the second arm member adjacent to the end portions of the slots and are operatively connected to the vehicle power source for preventing the power source from being started by the operator when the transmission linkage is in a neutral mode. In the neutral mode both the first and second pin members are positioned within the end portions of the respective first and second slots. When the transmission linkage is in the forward mode the first arm member and first pin member shift upwardly against the second arm member which causes the end portion of the second slot to shift upwardly and away from the second pin. In the reverse mode the first pin shifts downwardly away from the end portion of the first slot. Therefore, when the linkage shifts out of the neutral mode and into the forward or reverse driving modes one of the first or second pin members will shift out of the end portion of the respective slot. The first and second switches mounted to the second arm member detect when the first or second pin shifts out of the end portion of the respective slot. The switches are electrically connected to the power source or engine of the vehicle and act to generally prevent the engine from being started when the switches sense that the first or second pin has shifted out of the end portions of the slots. The switches according to the present invention therefore prevent the vehicle from being started when the transmission linkage is in a non-neutral mode.

BRIEF DESCRIPTION OF THE DRAWINGS

FIG. 2 is a partial side view of the control linkage and neutral start mechanism showing the linkage in its forward drive mode.

FIG. 3 is a partial side view of the hydrostatic transmission control and neutral start mechanism according to the present invention with the linkage shown in its reverse driving mode.

FIG. 4 is a perspective view of the body of the eccentric mechanism of the present invention.

DETAILED DESCRIPTION OF THE PREFERRED EMBODIMENT

Figure 1:
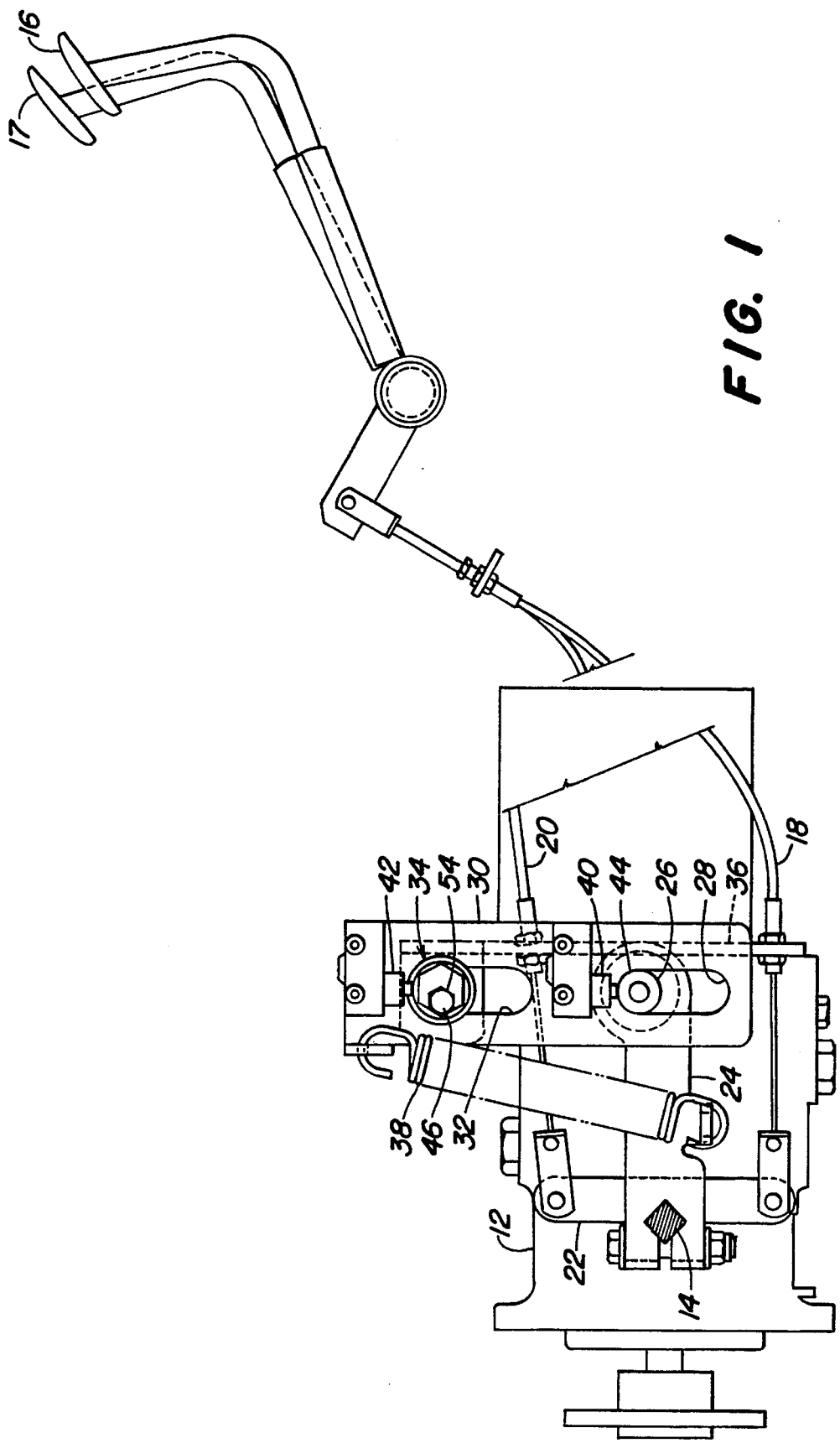
FIG. 1 is a side view of the hydrostatic transmission control and neutral start mechanism according to the preferred embodiment of the present invention, showing the transmission and control linkage in its neutral position.

Referring now to FIG. 1 there is shown the preferred embodiment of the present invention. A control linkage 10 is shown which allows an operator to control the hydrostatic transmission 12 of a vehicle (not shown). The hydrostatic transmission 12 includes an input control shaft 14 which is pivoted by the linkage 10 to determine the forward or reverse direction of vehicle travel and also the speed of the vehicle. Foot pedals 16 and 17 are pivotally carried in an operator's station of the vehicle. First and second cables 18 and 20 are operatively coupled with the foot pedals 16 and 17, and extend to a bracket 22 which is fixed with the input control 14 of the hydrostatic transmission 12. As the operator depresses the forward foot pedal 16, the first cable 18 is placed in tension and causes the bracket 22 to pivot counterclockwise to shift the input control shaft 14 to a forward driving mode. When the operator depresses the reverse foot pedal 17, the second cable 20 is placed in tension and pivots the bracket 22 in a clockwise direction for shifting the input control shaft 14 to a reverse driving mode. When either of the foot pedals 16 and 17 is released by the operator, the linkage mechanism 10 according to the present invention returns the bracket 22 and input control shaft 14 to a neutral position, as described in more detail below.

The neutral return mechanism 10 of the present invention includes a first arm member 24 which is fixed with the bracket 22 and input control shaft 14. The first arm 24 includes a first engagement member or first pin member 26 which is received within a first slot 28 of a second arm member 30. The second arm member 30 includes a second slot 32 which receives a second engagement member or eccentric pin member 34. The eccentric or second pin member 34 is supported by a plate member 36 which is rigidly fixed with the housing of the transmission 12, or to some other portion of the vehicle. A tension spring 38 is coupled between the first and second arm members 24 and 30 of the present invention. First and second switches 40 and 42 are fixed with the second arm member 30 for detecting the position of the first pin member 26 and eccentric pin member 34 within their respective slots 28 and 32. The first and second switches 40 and 42 are mounted to the second arm member 30 and are electrically coupled with the starting mechanism of the vehicle and generally prevent the operator from starting the vehicle when the transmission 12 is not in a neutral mode.

Next, the operation of the preferred embodiment will be described in greater detail. As the operator depresses the forward foot pedal 16, the linkage 10 assumes a configuration as shown in FIG. 2. With the forward foot pedal 16 pressed, the first cable 18 is pulled forwardly and becomes tensioned, which causes the bracket 22 to pivot in a counterclockwise direction. This causes the input control shaft 14 to pivot in a counterclockwise direction and propel the vehicle forwardly. The first arm member 24 will pivot with the bracket 22 and input control shaft 14 in the counterclockwise direction when in the forward drive mode. As the first arm member 24 pivots, the first pin 26 will shift upwardly as seen in FIG. 1 which causes the second arm member 30 to slide upwardly. The second slot 32 defined in the second arm member 30 allows the second arm member 30 to shift upwardly with respect to the eccentric pin 34 that is held in a fixed position by the plate 36. This forward mode of the control linkage 10 of the present invention is shown in FIG. 2 with the input control shaft 14, bracket 22, and first arm member 24 pivoted in a counterclockwise direction from the neutral position and the second arm member 30 is shown as shifted upwardly with respect to the eccentric pin member 34. The spring 38 which extends between the first and second arm members 24 and 30 has become stretched from its position shown in FIG. 1. Therefore, when an operator releases his foot from the forward pedal 16, the spring 38 will tend to bias the first and second arm members 24 and 30 from their position shown in FIG. 2 to the neutral positions shown in FIG. 1. The spring 38 is oriented such that it will bias the rearward portion of the first arm member 24 toward the top portion of the second arm member 30. However, the shifting of those portions of the first and second arm members 24 and 30 toward each other is limited by the fixed positions of the input control shaft 14 and the eccentric pin member 34.

When the operator presses the reverse foot pedal 17, the linkage mechanism 10 of the present invention assumes a configuration as shown in FIG. 3. With the reverse foot pedal 17 pressed, the second cable 20 shifts forwardly which pivots the bracket 22 and input control shaft 14 in a clockwise direction which drives the vehicle in the reverse direction. As shown in FIG. 3, the first arm member 24 will pivot with the input control shaft 14 in a clockwise direction, which causes the first pin member 26 to shift downwardly in the first slot 28 formed in the second arm member 30. The downward shifting of the first arm member 24 with respect to the second arm member 30 causes the spring 38 to become stretched from its position shown in FIG. 1. Therefore, when the operator releases his foot from the reverse foot pedal 17, the spring 38 will tend to urge the first arm member 24 upwardly from its position shown in FIG. 3 until the pin member 26 again assumes its neutral position in abutment against the end portion 44 of the first slot 28 as shown in FIG. 1. The present invention therefore provides a neutral return mechanism in both the forward and reverse modes.

The present invention also includes an adjustment feature which allows an operator to insure that the transmission is returned to its precise neutral, non-driving mode when the linkage 10 has been returned to its neutral state shown in FIG. 1. The eccentric pin member 34 can be loosened and pivoted slightly about a pivot axis 46 for shifting the eccentric pin 34 up or down. Shifting of the eccentric pin 34 either up or down will establish a new neutral position for the second arm member 30 as the eccentric pin member 34 abuts against the end portion 48 of the second slot 32. The new position of the eccentric pin member 34 also establishes a new neutral position for the first arm member 24 which is coupled with the input control shaft 14. Therefore, the linkage 10 can be adjusted to insure that it precisely locates the input control shaft 14 in its neutral position when the operator removes his foot from the pedals 16 and 17 and the linkage 10 returns to the neutral configuration shown in FIG. 1.

The linkage 10 shown in FIG. 1 could also be modified within the spirit of the present invention to include a first pin member that is an eccentric pin mechanism, rather than the second pin member being an eccentric mechanism. If the first pin member were an eccentric mechanism mounted to the first arm member 24, the position of the eccentric mechanism could be adjusted to insure that the first arm member returns the input control shaft 14 to its precise neutral position when the linkage mechanism 10 is in its neutral position. The vehicle would therefore be prevented from creeping in the forward or reverse direction when the operator removes his foot from the pedals 16 and 17.

The present invention includes a neutral start feature which includes first and second switches 40 and 42 fixed or mounted with the second arm member 30. The first and second switches 40 and 42 detect when the first or second pin members 26 or 34 have shifted from their respective positions at the ends 28 and 32 of the first and second slots 28 and 32. When either of the first or second pin members 26 and 34 shift from their positions at the ends of the respective slots 28 and 32, the transmission 12 is no longer in its neutral mode and the vehicle is either being driven in the forward or reverse direction. The switches 40 and 42 are electronically connected with the ignition or starter mechanism of the vehicle such that the vehicle is prevented from being started when either the first and second pin members 26 and 34 is not in abutment with the end portions 44 and 48 of the respective slot 28 or 32. The operator is thereby prevented from starting the vehicle when the transmission 12 is not in a neutral mode.

The forward and reverse foot pedals 16 and 17 shown in FIG. 1 according to the preferred embodiment are coupled with opposite ends of the bracket 22 for pivoting the input control shaft 14 in a counterclockwise direction for the forward driving mode and the clockwise direction for the reverse driving mode. The forward pedal 16 is operatively coupled with the bottom of the bracket 22 as shown in FIG. 1 and the reverse pedal 17 is operatively coupled with the top of the bracket 22. However, an alternate configuration of the present invention could provide an input control shaft adapted to pivot clockwise to the forward mode and counterclockwise to the reverse mode, and with the forward pedal coupled to the top portion of the bracket and the reverse pedal coupled to the bottom portion of the bracket.

Referring now to FIG. 4, there is shown a more detailed view of the eccentric second pin mechanism 34 of the preferred embodiment. The body 50 of the eccentric 34 includes an opening 52 through which a bolt 54, as seen in FIGS. 1–3, is received for fixing the body 50 to the plate member 36. The bolt 54 presses the body 50 against the plate member 36 to frictionally hold the body 50 in the selected position. The body 50 includes a surface abutment portion 56 which is positioned within the second slot 32. A ledge portion 58 of the body 50 is slightly larger than the second slot 32 and acts to contain the second arm member 30 in proper position adjacent the plate member 36. To adjust the eccentric 34, an operator untightens the bolt 54, and the operator is thereby allowed to swing the body 50 of the eccentric 34 about the pivot axis 46 defined by the bolt 54 to a new position. With the bolt 54 loosened the operator can swing the body 50 about the pivot axis 46 slightly upwardly or slightly downwardly from its position shown in FIG. 1. Once in its new position the body 50 can again be securely fixed to the plate member 36 by re-tightening the bolt 54. In its neutral position the second arm member 30 abuts the surface abutment portion 56 of the body 50. Therefore, the new position of the body 50 establishes a new neutral position for the second arm member 30. The second arm member 30 will be shifted slightly upwardly or downwardly from its position shown in FIG. 1 by the new position of the body 50 of the eccentric 34. The new neutral position of the second arm member 30 establishes a different position for the input control shaft 14 when the linkage 10 is in its new neutral mode, and the mechanism 10 is thereby adjustable for precisely positioning the input control shaft 14 at its neutral, non-driving mode when the linkage 10 is in its neutral mode. The switches 40 and 42 are mounted directly to the second arm member 30 and therefore shift with the second arm member 30 when the eccentric 34 is adjusted. The switches 40 and 42 according to the present invention therefore do not require any additional adjustment when the linkage 10 is adjusted for setting the linkage 10 to a precise neutral configuration.

I claim:

1. A neutral start linkage mechanism for a vehicle having a hydrostatic transmission having a pivotable input control shaft which controls the hydrostatic transmission, said mechanism being operatively coupled with the input control shaft, said mechanism comprising:

an operator engaged control, a first arm member operatively fixed with the input control shaft of the hydrostatic transmission, a first engagement member coupled with the first arm member a second arm member which extends generally at an angle to the first arm member, said second arm member having a first slot within which the first engagement member is received, a second slot within which is received a second engagement member which is rigidly fixed with the vehicle during vehicle operation, said linkage mechanism having forward, neutral and reverse modes; in the neutral mode the input control shaft is in a position whereat the transmission is placed in a neutral non-driving mode and the first and second engagement members are positioned within the end portions of the respective first and second slots; in the forward mode the input shaft has pivoted in a first direction for shifting the transmission to a forward driving mode and the first arm means pivots therewith which forces the first engagement member toward the end portion of the first slot and forces the second arm member to shift relative to the second engagement member such that the second engagement member shifts out of the end portion of the second slot; in the reverse mode the input control shaft is pivoted in a second direction for shifting the transmission to a reverse driving mode and the first arm member pivots therewith such that the first engagement member shifts out of the end portion of the first slot and the second engagement member remains positioned within the end portion of the second slot for generally blocking the second arm member from shifting, a biasing means extending between the first and second arm members for biasing the linkage to its neutral mode when the operator releases the operator engaged control, and first and second switch means for detecting the presence of the respective first and second engagement members within the end portions of the first and second slots when the linkage mechanism is in the neutral mode, and said switches are operatively connected with the vehicle power source for preventing the power source from being started by the operator when either of the first or second engagement members are not positioned within the end portion of the respective first or second slot.

2. The invention of claim 1, wherein the second engagement member is an eccentric member whose position is adjustable for adjusting the position of the second arm member when the linkage is in its neutral mode to thereby allow the transmission to be in a neutral mode when the linkage is in the neutral mode.

3. The invention of claim 1, wherein said first and second switches are button type switches which are depressed when the first and second engagement members are positioned within the end portion of the respective slots, and said button type switches are disengaged when the first and second engagement members shift out of the end portions of the slots.

* * * * *